(12) United States Patent
Tao et al.

(10) Patent No.: US 8,216,107 B2
(45) Date of Patent: Jul. 10, 2012

(54) PLANETARY RING GEAR LUG DESIGN FOR NVH IMPROVEMENT

(75) Inventors: Kun Tao, Irvine, CA (US); Susan M. Stroope, Oxford, MI (US)

(73) Assignee: Borgwarner Inc., Auburn Hills, MI (US)

( * ) Notice: Subject to any disclaimer, the term of this patent is extended or adjusted under 35 U.S.C. 154(b) by 473 days.

(21) Appl. No.: 12/454,432

(22) Filed: May 18, 2009

(65) Prior Publication Data

US 2010/0292043 A1 Nov. 18, 2010

(51) Int. Cl.
*F16H 57/08* (2006.01)
(52) U.S. Cl. ........................................ 475/344
(58) Field of Classification Search .......... 475/344, 475/204; 74/434, 437, 438
See application file for complete search history.

(56) References Cited

U.S. PATENT DOCUMENTS

| | | | |
|---|---|---|---|
| 3,183,734 A * | 5/1965 | Kuntzmann | 74/434 |
| 4,440,042 A | 4/1984 | Holdeman | |
| 4,889,012 A | 12/1989 | Dull | |
| 4,901,602 A | 2/1990 | Matoba | |
| 5,181,433 A * | 1/1993 | Ueno et al. | 74/409 |
| 5,716,300 A | 2/1998 | Sammataro et al. | |
| 5,766,109 A | 6/1998 | Sudau | |
| 5,797,185 A | 8/1998 | Sammataro et al. | |
| 6,033,335 A | 3/2000 | Hotta et al. | |
| 6,117,036 A | 9/2000 | Lanzon et al. | |
| 6,402,654 B1 * | 6/2002 | Lanzon et al. | 475/204 |
| 7,762,155 B2 * | 7/2010 | Vranish | 74/414 |
| 2002/0073795 A1 | 6/2002 | Bodtker et al. | |
| 2009/0062058 A1 * | 3/2009 | Kimes et al. | 475/344 |

* cited by examiner

*Primary Examiner* — David D Le
*Assistant Examiner* — David J Hlavka
(74) *Attorney, Agent, or Firm* — Warn Partners, P.C.

(57) ABSTRACT

In the present invention, an improved planetary gearset which reduces the amount of vibration transferred from the planetary gearset to a housing. The present invention is a new way to interface the ring gear of a planetary gearset with the housing by incorporating a series of lugs around the ring gear and adjusting the number of lugs and the size and the shape of the lugs. The distribution of these lugs affects the sound levels transferred from the planetary gearset. Additionally, multiple rows of lugs can also be strategically arranged on one ring gear to gain further noise and vibration improvement.

17 Claims, 6 Drawing Sheets

PLANETARY RING GEAR LUG DESIGN FOR NVH IMPROVEMENT

FIELD OF THE INVENTION

The present invention relates to reducing the amount of vibration transferred from the ring gear of a planetary gearset to the housing used to support the ring gear.

BACKGROUND OF THE INVENTION

A planetary gearset is a popular system widely used in many types of applications for speed and torque transfer. Numerous efforts have been made to reduce vibration, and therefore noise emitted by the planetary gear system during operation. However, there have been few published studies aimed at reducing the vibration levels through optimizing the interface between the planetary gearset and any supporting components. Planetary gearsets are commonly supported by grounding the ring gear of the planetary gearset to some type of housing. The housing is commonly part of a transfer case or transmission. The main problem occurs when the planetary gearset rotates. As this occurs, vibration is transferred from the planetary gearset to the housing of the transfer case (or transmission). This vibration is often transferred through other various components of the vehicle. Therefore, there exists a need for an improvement in the planetary gearset which would reduce vibration transferred through a transfer case, or transmission, and other vehicle components.

SUMMARY OF THE INVENTION

The present invention is an improved planetary gearset which reduces the amount of vibration transferred from the planetary gearset to a housing. This reduction in vibration is accomplished through a new way of interfacing the ring gear of a planetary gearset with a housing by incorporating a series of lugs around the ring gear, as well as adjusting the number of lugs, the size, and the shape. The distribution of these lugs affects the vibration transferred from the planetary gearset to the housing. Additionally, multiple rows of lugs can also be strategically arranged on one ring gear to gain further noise and vibration improvement. The present invention is also directed to a vibration reduction planetary gearset having a sun gear mounted on an input shaft, at least one planetary gear in mesh with the sun gear, a ring gear surrounding and in mesh with the planetary gear, and a housing having at least one recess where the housing is used for receiving the ring gear. The present invention also has at least one lug fixed to and circumscribing the ring gear for locating the ring gear in the recess of the housing. When the ring gear is positioned in the housing such that the lug is received by the recess, it reduces the amount of vibration transferred from the sun gear and the planetary gear to the ring gear. This will result in a reduction in the amount of vibration transferred to the housing.

Further areas of applicability of the present invention will become apparent from the detailed description provided hereinafter. It should be understood that the detailed description and specific examples, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
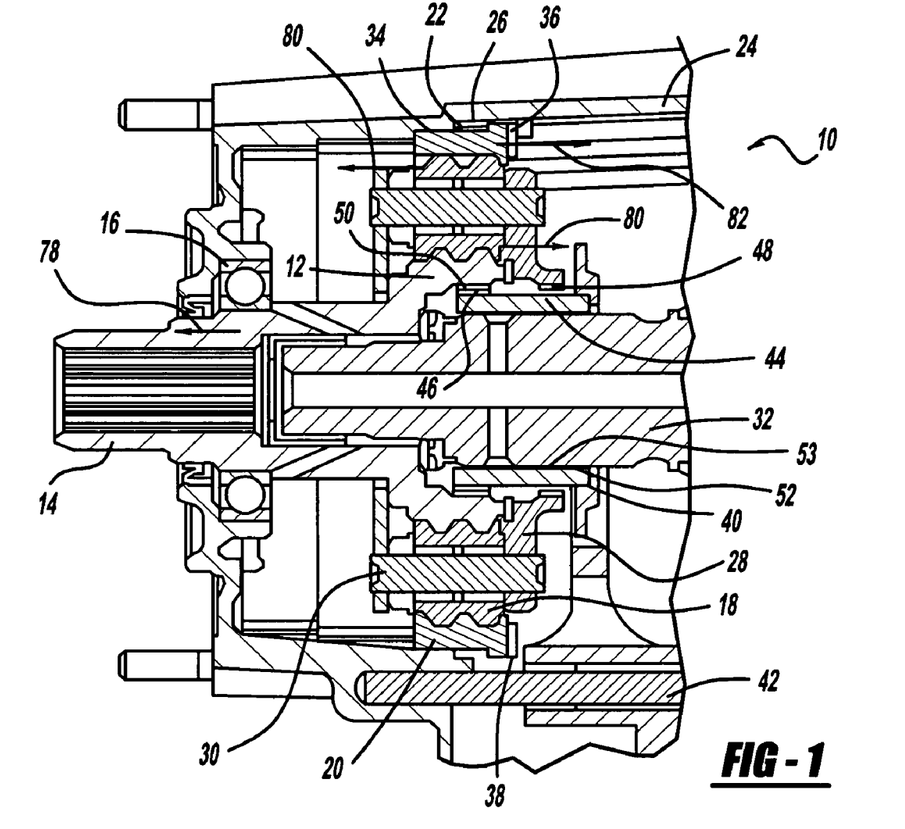
FIG. 1 is a sectional side view of a transfer case incorporating a planetary gearset, according to the present invention.
Figure 2:
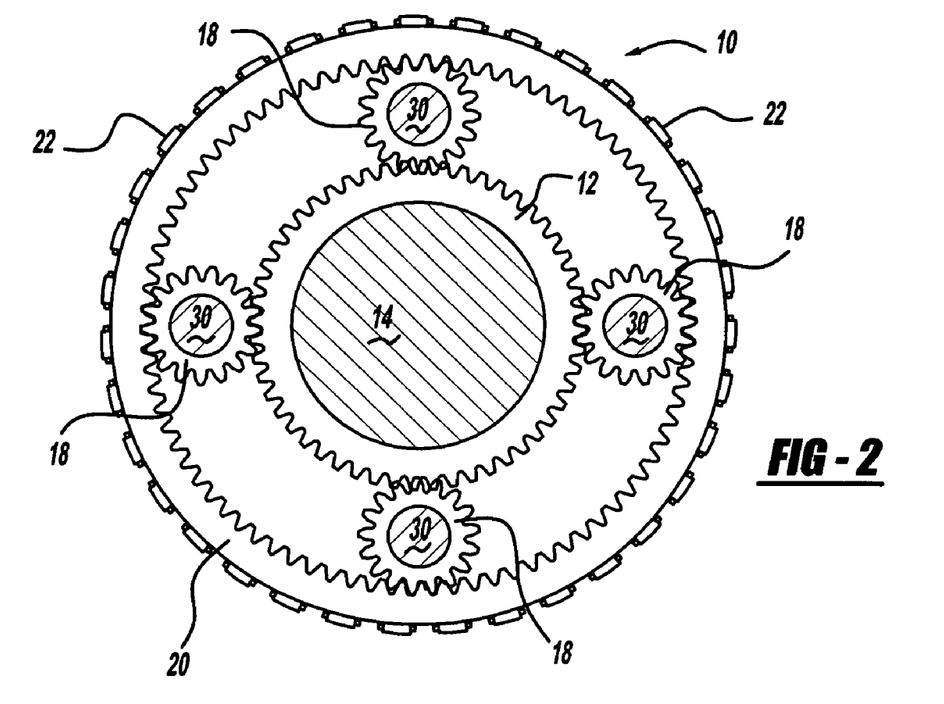
FIG. 2 is a front plan view of a planetary gearset with the housing removed to better display the series of lugs circumscribing the ring gear, according to the present invention.

Referring to FIGS. 1 and 2, a planetary gearset having lugs for reducing vibration according to the present invention is shown at 10. The gearset 10 includes a sun gear 12 mounted to an input shaft 14. The input shaft 14 is rotationally supported by an input bearing 16. Surrounding the sun gear 12 is a series of planetary gears 18, which are in mesh with the sun gear 12, and a ring gear 20. Circumscribing the ring gear 20 is a plurality of lugs 22 which are used to locate the ring gear 20 in a housing 24. The housing 24 includes a series of corresponding recesses 26 for receiving the lugs 22, thereby holding the ring gear 20 in a permanent fixed position in the housing 24. The planetary gears 18 are typically connected to a carrier 28 through the use of stub shafts 30, and the carrier 28 is selectively connected to an output shaft 32. The housing 24 has a first groove 34 for receiving the ring gear 20. Holding the ring gear 20 in place in the first groove 34 is a snap ring 36 located in a second groove 38.

The sun gear 12 and the carrier 28 can be selectively coupled to the output shaft 32 through the use of a dog clutch 40. The dog clutch 40 is able to slide along the rail 42 through the use of an actuator (not shown). The dog clutch 40 is connected to a sleeve 44. The sleeve 44 has a set of teeth 46 which are engageable with either a set of corresponding teeth 48 on the carrier 28, or a set of corresponding teeth 50 on the sun gear 12. The sleeve 44 also has a set of teeth 52 which are splined to a set of corresponding teeth 53 on the output shaft 32. The connection between the teeth 52 on the sleeve 44 and the teeth 53 on the output shaft 32 allows the sleeve 44 to slide along the output shaft 32, while still transferring rotational force.

During normal operation, the input shaft 14 drives the sun gear 12, which in turn causes the planetary gears 18 to also rotate. It should also be noted that the input to the gearset 10 could be to the carrier 28, and the output can be the sun gear 12. The ring gear 18 is prevented from rotating inside the housing 24 by the lugs 22.

When the dog clutch 40 is moved to a position where the teeth 46 on the sleeve 44 are engaged with the set of corresponding teeth 48 on the carrier 28, the gearset will operate in a low-speed, high-torque mode. Rotational force will be transferred from the input shaft 14 to the sun gear 12; the sun gear 12 will rotate and transfer this rotational force to the planetary gears 18. Some of this force from the planetary gears 18 is transferred to the ring gear 20. As the planetary gears 18 rotate, the carrier 28 will rotate as well; this in turn will cause the sleeve 44 and therefore the output shaft 32 to rotate. Because of the rotational force from the sun gear 12 being transferred through the planetary gears 18 and carrier 28 before being transferred to the output shaft 32, the output shaft 32 will rotate at a slower speed, but will transfer a higher amount of rotational force compared to the input shaft 14. This provides a high-torque, low-speed mode in which a vehicle incorporating the present invention can use the transfer case for towing or other applications requiring a high-torque output.

When the dog clutch 40 is moved into a position where the teeth 46 are engaged with the set of corresponding teeth 50 on the sun gear 12, speed and rotational force will be transferred directly from input shaft 14 through the sun gear 12 to the sleeve 44 and to the output shaft 32. The ratio in this mode between input to output will be one-to-one.

As all of the gears in the gearset 10 rotate, vibrations are generated throughout the entire gearset 10, and are transferred to the housing 24. The vibration will occur whether the dog clutch 40 is engaged with the sun gear 12 or the carrier 28. The lugs 22 function not only to hold the ring gear 20 in a stationary position within the housing 24, but also to reduce the vibrations transferred from the gearset 10 to the housing 24. The vibrations transferred to the housing 24 occur with a specific frequency, behaving similar to a sinusoidal wave pattern, with the amplitude and frequency dependent upon the speed of rotation of the sun gear 12 and planetary gears 20.

FIG. 2 shows a side view of the planetary gearset 10 with the housing 24 removed to better display the lugs 22. As can bee seen in FIG. 2, the lugs 22 circumscribe the ring gear 20. Different types of applications can generate various types of vibrations, and the number, size, shape, and position of the lugs 22 is chosen to reduce the vibration transferred to the housing 24 based on the type of application where the housing 24 having the lugs 22 is being used. Also, other factors have to be taken into account when choosing the proper amount of lugs 22 for the design. Any number of lugs 22 can be used; as few as nine lugs 22 will show improvement in reducing the vibration between the housing 24 and the gearset 10. The more lugs 22 that are used, the greater the improvement in reduction of vibration.

Figure 3:
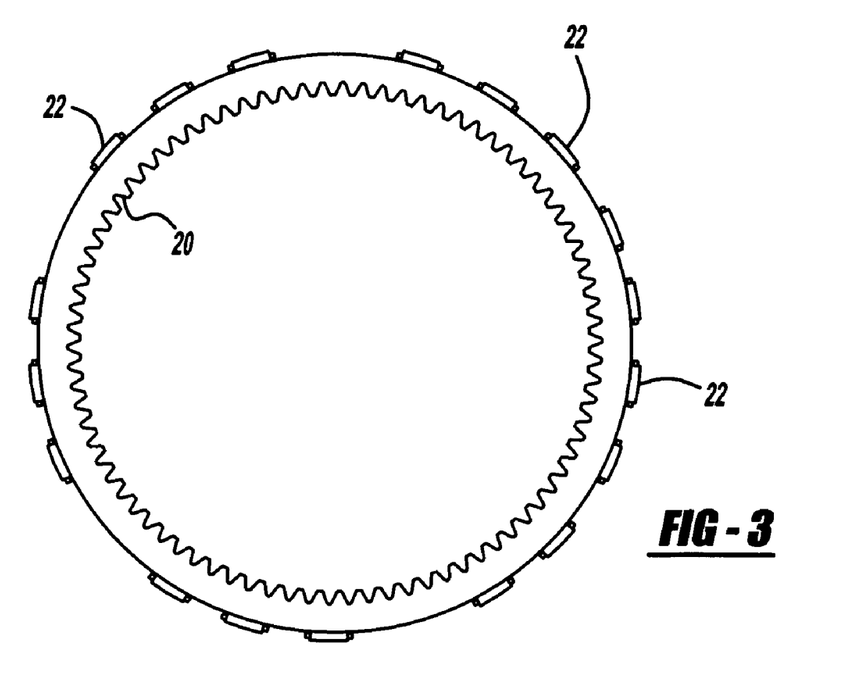
FIG. 3 is a front plan view of one embodiment of a ring gear for reducing vibration, according to the present invention.

One embodiment of a ring gear 20 incorporating lugs 22 according to the present invention is shown in FIG. 3. The ring gear 20 in this embodiment has eighteen lugs 22 spaced in specific positions around the ring gear 20. The lugs 22 will absorb the vibration transferred from the ring gear 20 to the housing 24.

Figure 4:
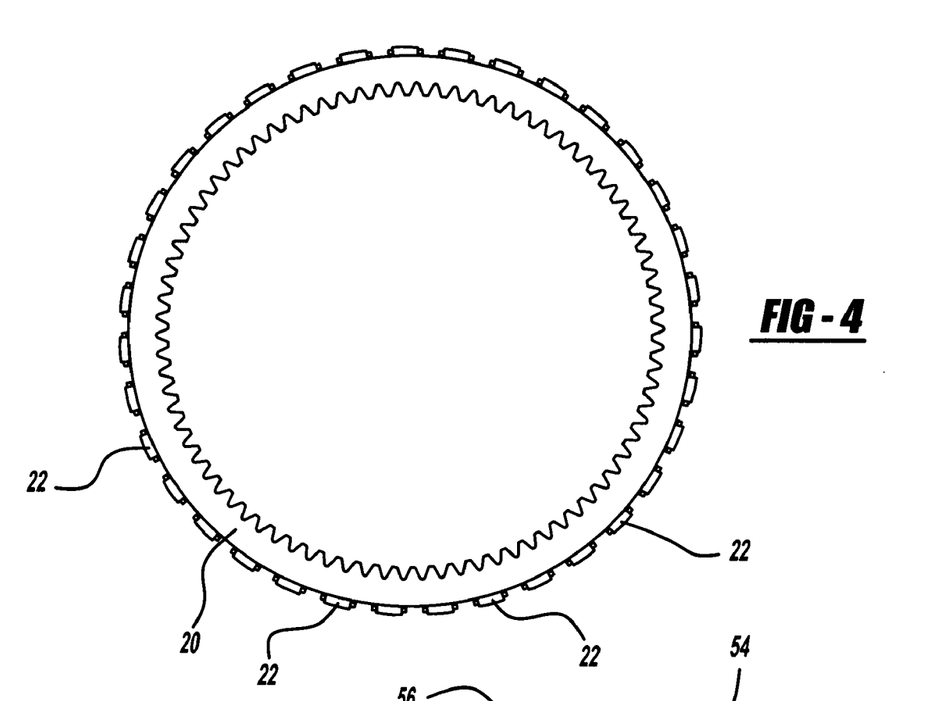
FIG. 4 is a front plan view of another embodiment of a ring gear for reducing vibration, according to the present invention.

Initially, as more lugs 22 are added, the space between the corresponding recesses 26 will continuously decrease. Another embodiment of a ring gear 20 incorporating lugs 22 according to the present invention is shown in FIG. 4. The ring gear 20 in FIG. 4 has thirty-six lugs 22, which are equally spaced around the ring gear 20. Because more lugs 22 have been added, the space between the lugs 22 is reduced, and the space between the recesses 26 is reduced as well.

Figure 5:
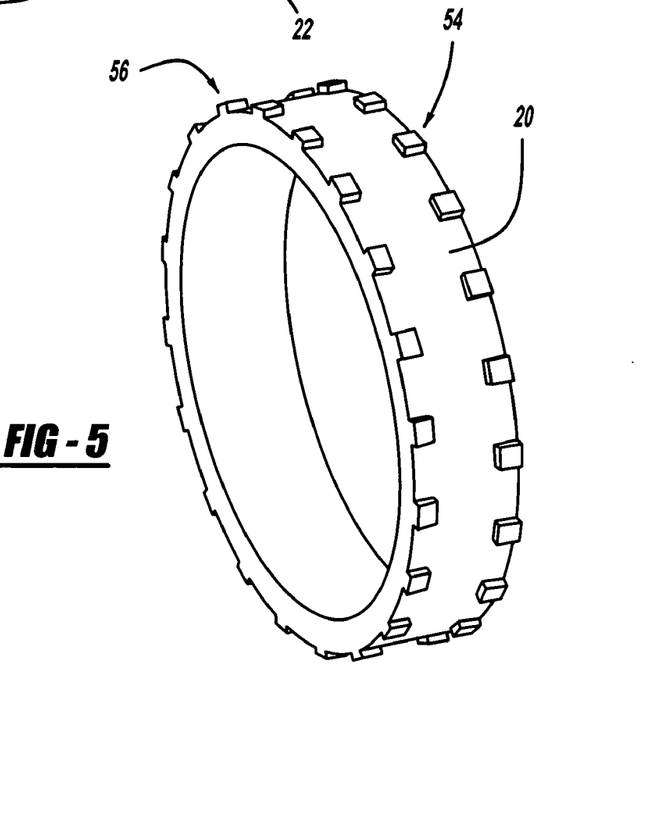
FIG. 5 is a perspective view of a ring gear incorporating a first row of lugs and a second row of lugs, according to the present invention.

In another embodiment, multiple rows of lugs 22 can be strategically arranged on one ring gear 20 to gain further noise and vibration improvement. This achieves the same result as having the same number of lugs 22 spaced in a single row around the ring gear 20. Referring to FIG. 5, the ring gear 20 is shown having a first row of lugs generally shown at 54 and a second row of lugs generally shown at 56. The first row of lugs 54 and the second row of lugs 56 both have lugs 22 which are the same type of lugs 22 used in the prior embodiments previously discussed. However, the first row of lugs 54 is offset from the second row of lugs 56, providing for a greater reduction in vibration. The advantage with this embodiment is that multiple rows allow for the same reduction in vibration compared to a single row having the same total number of lugs 22 as the multiple rows because there is a larger area which is used for absorbing vibration as compared to a ring gear 22 which has a single row of lugs 22. Additionally, because the lugs 22 are arranged in rows, the spacing between the individual lugs 22 is greater, allowing for the housing to be manufactured with greater ease.

Additional rows can be added, such as a third row of lugs 22 and a fourth row of lugs 22, but increasing the number of rows presents similar problems seen with increasing the number of lugs 22 in a single row. As more rows are added, each row is offset from each of the prior rows, and the ring gear 20 becomes more costly and difficult to manufacture.

Figure 6:
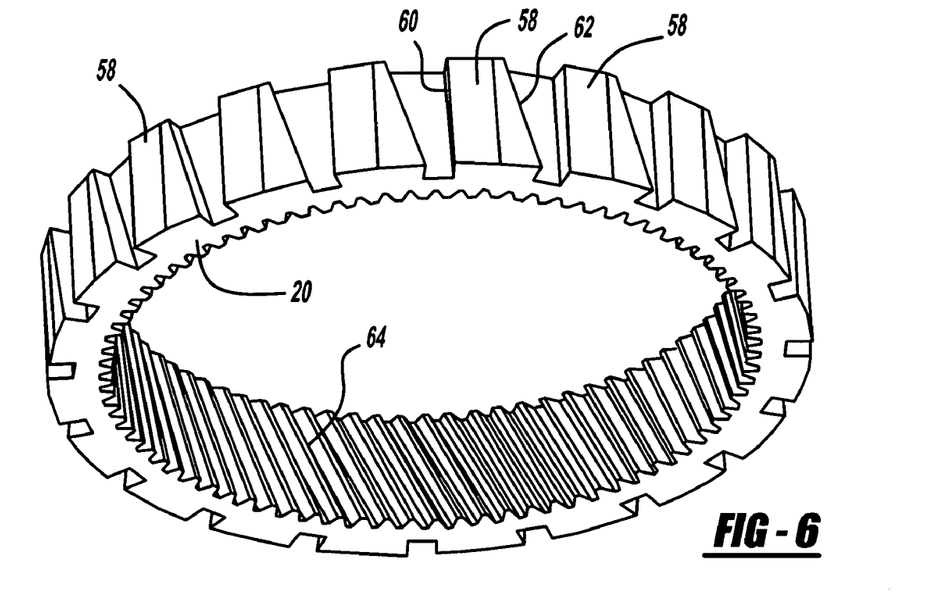
FIG. 6 is a perspective view of a ring gear having a first type of helical lugs circumscribing the ring gear, according to the present invention.

An embodiment showing a variation of the shape of the lugs 20 is shown in FIG. 6. FIG. 6 shows a series of helical lugs 58 circumscribing the ring gear 20. Each helical lug 58 has a flat surface 60, and an angled surface 62. The flat surface 60 is similar in shape compared to the lugs 22 seen in the previous embodiments. The ring gear 20 in FIG. 6 is inserted into the housing 24 in a similar manner as the ring gear 20 in previous the embodiments, with the exception that the recesses 26 in the housing 24 would be different in order to receive the helical lugs 58.

It should also be noted that the ring gear 20 in FIG. 6 also has helical gear teeth 64. The helical gear teeth 64 would be used with planetary gears having corresponding helical gear teeth. The purpose of having the helical lugs 58 serves two functions. The first function is that the angled surface 62 provides a larger surface area for absorbing vibration between the ring gear 20 and the housing 24. The second function relates to the helical gear teeth 64, which will be described later.

Figure 7:
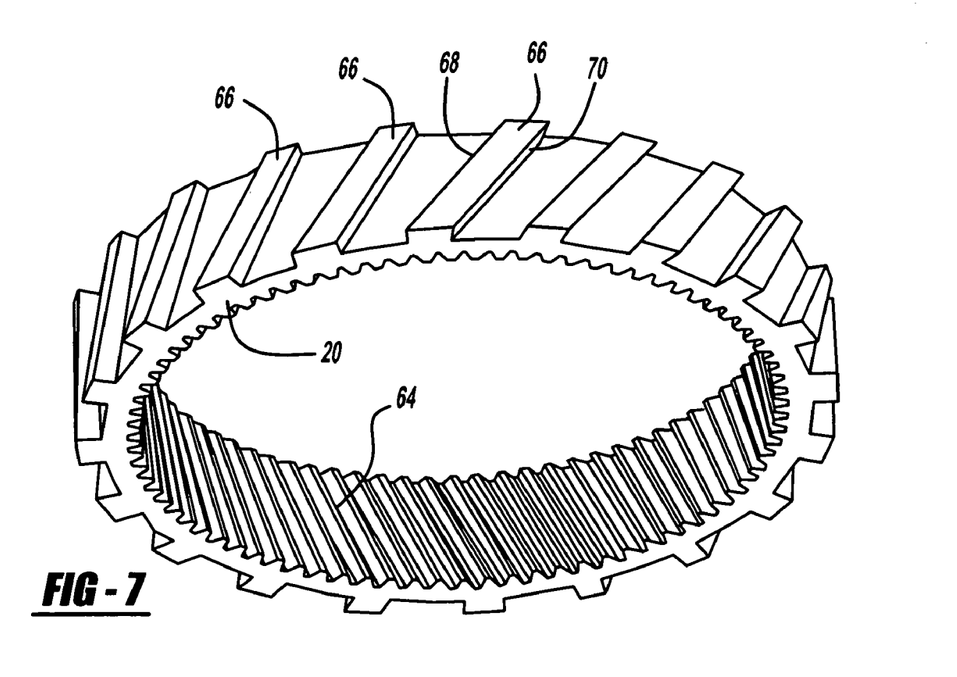
FIG. 7 is a perspective view of a ring gear incorporating a second type of helical lugs circumscribing the ring gear, according to the present invention.

Another type of helical lug design is shown in FIG. 7. The ring gear 20 in FIG. 7 has another type of helical lug 66. These helical lugs 66 have a first helical surface 68, similar to the angled surface 62 on the helical lug 58, but also have a second helical surface 70. The helical lugs 66 having a first helical surface 68 and a second helical surface 70 have an even greater surface area for absorbing vibration.

The ring gear 20 shown in FIG. 7 also has helical gear teeth 64, similar to the embodiment shown in FIG. 6. The angle of the helical gear teeth 64 and the angled surface 62 of the helical lugs 58 are angled in opposite directions of one another. Similarly, the first helical surface 68 and the second helical surface 70 of the helical lugs 66 in FIG. 7 are also positioned at the opposite angle as the helical gear teeth 64.

Figure 8:
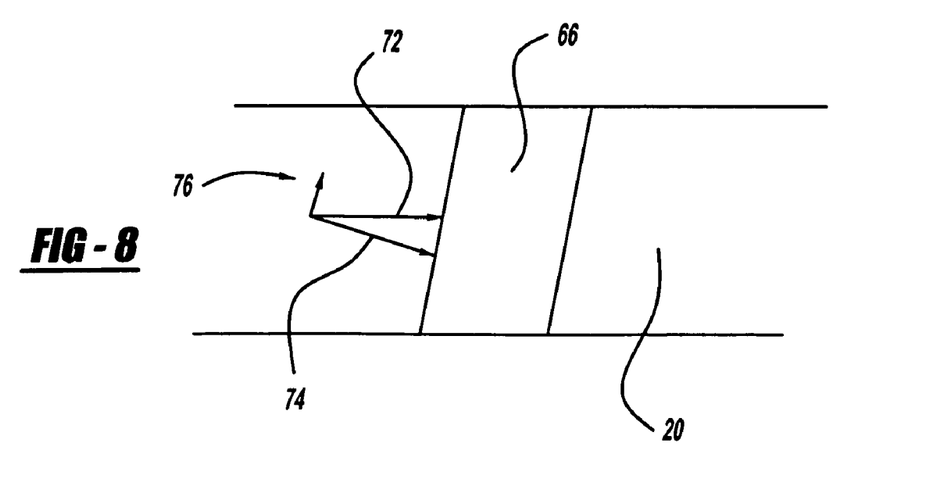
FIG. 8 is a partial top view of a ring gear having the second type of helical lugs which also demonstrates the load applied to an individual helical lug, according to the present invention.

As the planetary gears 20 having corresponding helical gear teeth rotate in the ring gear 20 shown in FIG. 6 or 7, a force is exerted on each of the helical gear teeth 64 in both FIGS. 6 and 7. Referring to FIG. 8, this force exerted on each of the helical lugs 58,66 is a tangential force 72. Note that the helical lug 66 is shown in FIG. 8, but the loading applied to the helical lug 66 is applied to the helical lug 58 shown in FIG. 6 in the same manner. This tangential force 72 is translated tangentially to the outside diameter of the ring gear 20. This tangential force 72 results in two different forces applied to each helical lug 66. The first force is a normal force 74 which is applied perpendicularly to the first helical surface 68 of each helical lug 66; the second force is translated as an axial force 76 which is translated parallel to the surface of the helical gear teeth 58.

A sun gear 12 used with a ring gear 18 according to the embodiment shown in FIG. 6 or 7 would also have corresponding helical gear teeth to mesh with the helical gear teeth on the planetary gears. This type of gearset would have several thrust forces in the axial direction that would be balanced by the system. These forces are shown in FIG. 1. There are thrust forces 78 which would cause the sun gear 12 and hence the input shaft 14 to be driven away from the planetary gears 18. These thrust forces 78 in the axial direction from the helical grooves on the sun gear 12 would be balanced by the input bearing 16. There are also thrust forces 80 in the axial direction applied to the sun gear 12 and the ring gear 20 from the planetary gears 18; these thrust forces 80 are equal and opposite and cancel each other out. There are also thrust forces 82 in the axial direction applied from the ring gear 20 which are balanced by the snap ring 36. The snap ring 36 can also absorb vibrations as they are transferred through the gearset 10. The snap ring 36 is made of a softer material compared to the ring gear 20 and the other components, allowing for it to provide additional absorption of vibrations.

One common advantage of both types of helical lugs 58,66 is that not only is there greater surface area for absorbing vibration, but as the planetary gears 18 having helical gear teeth rotate in the ring gear 20 also having helical gear teeth, the ring gear 20 will move axially in the housing 24 as vibration is transferred from the ring gear 20 to the housing 24. This movement of the ring gear 20 will be very slight, approximately the distance between the lugs 58,66 on the ring gear 20 and the recesses in the housing 24. This distance can vary, depending on the tolerances between the housing 24 and the ring gear 20. The slight axial movement as the ring gear 20 absorbs vibration will cause some friction between the helical lugs 58,66 and their corresponding recesses in the housing 24. Transferring this friction into heat is another way for vibration to be absorbed into the system.

Figure 9:
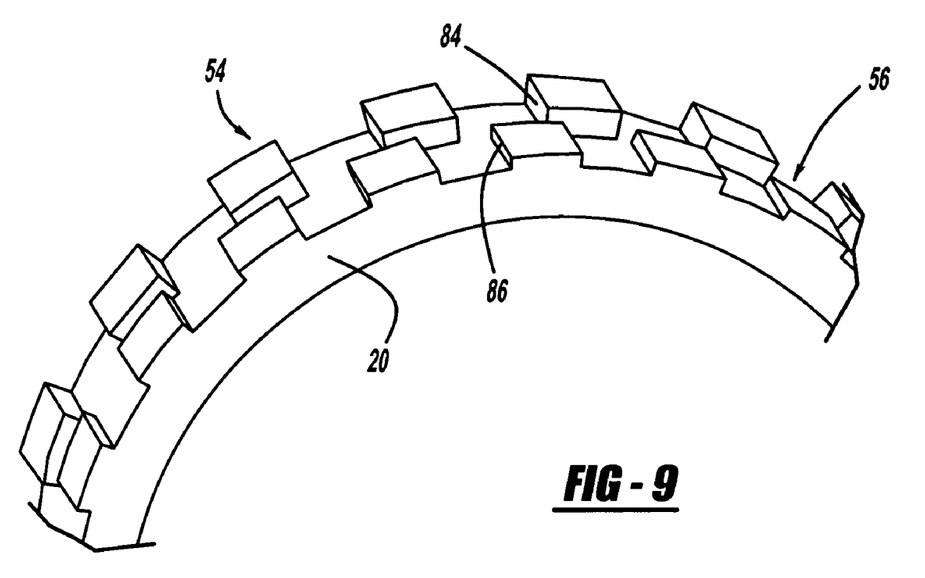
FIG. 9 is a sectional perspective view of a ring gear having a first row of lugs and a second row of lugs, where the first row of lugs is of one height, and the second row of lugs is at another height, according to the present invention.
Figure 10:
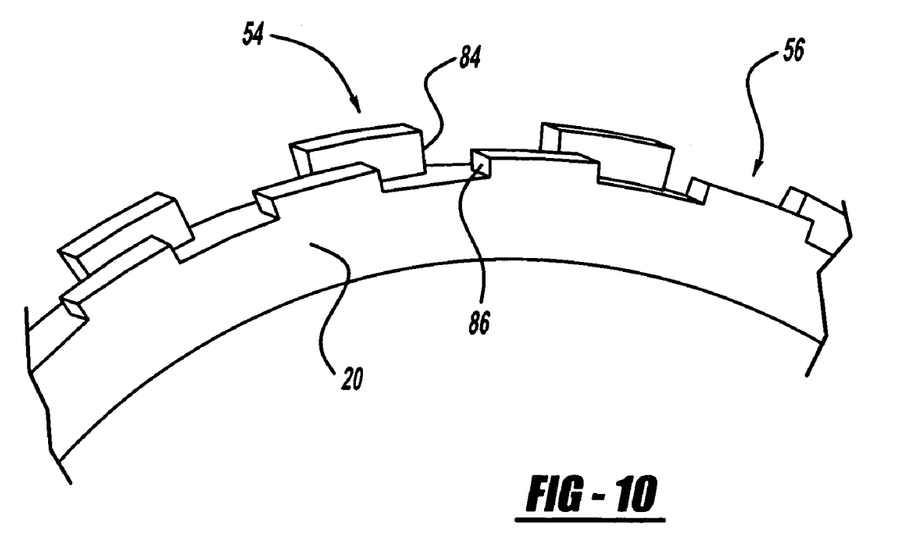
FIG. 10 is a second perspective view of a ring gear having a first row of lugs and a second row of lugs, where the first row of lugs is at one height, and the second row of lugs is at another height, according to the present invention.
Figure 11:
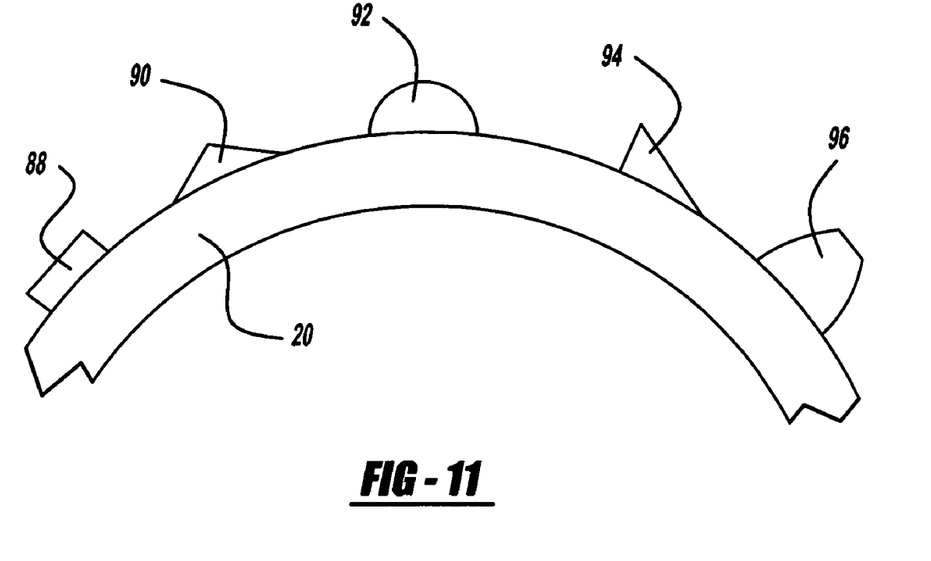
FIG. 11 is a side plan view of a ring gear incorporating a square lug, a triangle lug, a circular lug, a half-triangle lug and an involute spline lug, according to the present invention.

Another embodiment of the present invention is shown in FIGS. 9 and 10. The ring gear 20 in FIGS. 9 and 10 has a first row of lugs generally shown at 54 and a second row of lugs generally shown at 56, similar to what is also shown in FIG. 5. These rows 54,56 are also staggered, but different from FIG. 5 is the added feature that the first row of lugs 54 is at a first height 84, and the second row of lugs 56 is at a second height 86. Arranging the first row of lugs 54 and the second row of lugs 56 in this manner increases the effect of phasing the first row of lugs 54 and the second row of lugs 56. In this embodiment, the first row of lugs 54 set at the first height 84, which is taller than the second height 86, is installed in the housing 24 first, with the second row of lugs 56 having the second height 86 installed in the housing such that the second row of lugs 56 rests against the snap ring 34.

FIG. 10 shows a ring gear 20 having other various types of lug designs. FIG. 10 shows that the lugs 22 could be in the form of a square 88, triangle 90, circle 92, half-triangle 94, or an involute spline 96. The lugs 22 can also take the form of any type of polygon, and be suited to any type of application.

The present invention is not limited to use for a transfer case. The present invention also includes use for any number of applications requiring the use of a planetary gearset, where a ring gear is to be held stationary.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A vibration reduction planetary gearset, comprising:
    a sun gear mounted on an input shaft;
    at least one planetary gear in mesh with said sun gear;
    a ring gear surrounding and in mesh with said at least one planetary gear;
    a housing having a plurality of recesses, for receiving said ring gear;
    a first row of lugs affixed to and circumscribing said ring gear, for locating said ring gear in a first portion of said plurality of recesses of said housing; and
    a second row of lugs affixed to and circumscribing said ring gear, for locating said ring gear in a second portion of said plurality of recesses of said housing.

2. The vibration reduction planetary gearset of claim 1, wherein said first row of lugs and said second row of lugs are connected to said ring gear to minimize the amount of vibration transferred from said ring gear to said housing.

3. The vibration reduction planetary gearset of claim 1, wherein the shape of said first row of lugs and said second row of lugs is one selected from the group comprising a triangle, a square, a rectangle, a circle, a half-triangle, an involute, or a polygon.

4. The vibration reduction planetary gearset of claim 1, wherein one of said first row of lugs and one of said second row of lugs includes at least one helical lug.

5. The vibration reduction planetary gearset of claim 4, wherein said helical lug further comprises a flat surface and an angled surface.

6. The vibration reduction gearset of claim 4, wherein said helical lug further comprises a first helical surface and a second helical surface.

7. The vibration reduction gearset of claim 1, wherein said ring gear is retained in said housing by a snap ring, wherein said snap ring absorbs vibration from said ring gear.

8. A vibration reduction planetary gearset, comprising:
    a sun gear mounted on an input shaft;
    at least one planetary gear in mesh with said sun gear;
    a ring gear surrounding and in mesh with said at least one planetary gear;
    a housing having a plurality of recesses, for receiving said ring gear;
    a plurality of lugs affixed to and circumscribing said ring gear, for locating said ring gear in said plurality of recesses of said housing;
    a first portion of said plurality of lugs arranged in a first row affixed to and circumscribing said ring gear; and
    a second portion of said plurality of lugs arranged in a second row affixed to and circumscribing said ring gear.

9. The vibration reduction planetary gearset of claim 8, wherein said second row of lugs are arranged to be offset from said first row of lugs.

10. The vibration reduction planetary gearset of claim 8, wherein said first row of lugs has a first height, and said second row of lugs has a second height, said first height being different from said second height.

11. The vibration reduction planetary gearset of claim 8, wherein said ring gear further includes a third row of lugs offset from said first row of lugs, and said second row of lugs.

12. The vibration reduction planetary gearset of claim 11, wherein said ring gear further includes a fourth row of lugs offset from said first row of lugs, said second row of lugs, and said third row of lugs.

13. The vibration reduction planetary gearset of claim 8, wherein the shape each one of said plurality of lugs is one selected from the group comprising a triangle, a square, a rectangle, a circle, a half-triangle, an involute, and a polygon, or combinations thereof.

14. The vibration reduction planetary gearset of claim 8, wherein each one of said plurality of lugs is a helical lug.

15. The vibration reduction planetary gearset of claim 14, wherein said helical lugs further comprises a flat surface and an angled surface.

16. The vibration reduction gearset of claim 14, wherein said helical lugs further comprises a first helical surface and a second helical surface.

17. The vibration reduction gearset of claim 8, wherein said ring gear is retained in said housing by a snap ring, said snap ring absorbing some of said vibration from said ring gear.

* * * * *